(12) United States Patent
Peck et al.

(10) Patent No.: US 10,981,357 B2
(45) Date of Patent: Apr. 20, 2021

(54) GLASS ARTICLE

(71) Applicant: AGC Automotive Americas Co., Alpharetta, GA (US)

(72) Inventors: Timothy D. Peck, White Lake, MI (US); Rachael M. Blodgett, Waterford, MI (US)

(73) Assignee: AGC Automotive Americas Co., Alpharetta, GA (US)

( * ) Notice: Subject to any disclaimer, the term of this patent is extended or adjusted under 35 U.S.C. 154(b) by 251 days.

(21) Appl. No.: 15/994,991

(22) Filed: May 31, 2018

(65) Prior Publication Data

US 2019/0366692 A1 Dec. 5, 2019

(51) Int. Cl.
| | |
|---|---|
| *B32B 17/10* | (2006.01) |
| *B32B 7/02* | (2019.01) |
| *C03C 3/087* | (2006.01) |
| *C03C 3/093* | (2006.01) |
| *C03C 3/097* | (2006.01) |

(52) U.S. Cl.
CPC .......... *B32B 17/10036* (2013.01); *B32B 7/02* (2013.01); *B32B 17/10788* (2013.01); *C03C 3/087* (2013.01); *C03C 3/093* (2013.01); *C03C 3/097* (2013.01); *B32B 2250/03* (2013.01); *B32B 2307/412* (2013.01); *B32B 2605/006* (2013.01)

(58) Field of Classification Search
CPC ........ B32B 7/00–7/14; B32B 17/00–17/1099; C03C 3/076–3/118
See application file for complete search history.

(56) References Cited

U.S. PATENT DOCUMENTS

| | | | |
|---|---|---|---|
| 3,083,551 | A | 4/1963 | Pilkington |
| 3,700,542 | A | 10/1972 | Davis |
| 3,700,543 | A | 10/1972 | Davis |

(Continued)

FOREIGN PATENT DOCUMENTS

| | | |
|---|---|---|
| GB | 2078169 A | 1/1982 |
| JP | 2007290549 A | 11/2007 |

(Continued)

OTHER PUBLICATIONS

Pilkington, L.A.B. "The Float Glass Process", Proceedings of the Royal Society of London. Series A, Mathematical and Physical Sciences , Dec. 16, 1969, vol. 314, No. 1516 (Dec. 16, 1969); pp. 1-25.*

(Continued)

*Primary Examiner* — Prashant J Khatri
(74) *Attorney, Agent, or Firm* — Howard & Howard Attorneys PLLC (57) ABSTRACT

A glass article includes a first outermost pane, a second outermost pane disposed opposite the first outermost pane, and a transparent interlayer disposed between the first and second outermost panes. The first outermost pane has a thickness of from 1.1 to 4.0 mm, and has a first glass transition temperature. The second outermost pane has a thickness of from 0.3 to 1.05 mm, and has a second glass transition temperature. The second glass transition temperature of the second outermost pane is from 1 to 40° C. greater than the first glass transition temperature of the first outermost pane.

23 Claims, 4 Drawing Sheets
(1 of 4 Drawing Sheet(s) Filed in Color)

(56) References Cited

U.S. PATENT DOCUMENTS

| | | | |
|---|---|---|---|
| 4,859,636 A * | 8/1989 | Aratani | C03C 21/00 501/72 |
| 7,892,999 B2 | 2/2011 | Nagai et al. | |
| 8,495,895 B2 | 7/2013 | Yamada et al. | |
| 9,375,900 B2 | 6/2016 | Tsuchiya et al. | |
| 2013/0295357 A1 | 11/2013 | Cleary et al. | |
| 2017/0008377 A1 | 1/2017 | Fisher et al. | |
| 2017/0021597 A1* | 1/2017 | Michetti | B32B 17/10807 |
| 2017/0050415 A1 | 2/2017 | Kanki et al. | |
| 2017/0113520 A1 | 4/2017 | Sienerth et al. | |
| 2018/0250918 A1 | 9/2018 | Schall et al. | |
| 2018/0370194 A1 | 12/2018 | Claireaux et al. | |

FOREIGN PATENT DOCUMENTS

| | | | | |
|---|---|---|---|---|
| WO | WO-9948824 A1 * | 9/1999 | | C03C 21/002 |
| WO | WO-2015092385 A1 * | 6/2015 | | B32B 17/10889 |
| WO | 2015158464 A1 | 10/2015 | | |
| WO | 2017099166 A1 | 6/2017 | | |
| WO | 2017103032 A1 | 6/2017 | | |
| WO | 2017103471 A1 | 6/2017 | | |

OTHER PUBLICATIONS

English language abstract and machine-assisted English translation for JP 2007-290549 extracted from espacenet.com database on Jun. 21, 2018, 16 pages.

English language abstract and machine-assisted English translation for WO 2017/099166 extracted from espacenet.com database on Jun. 21, 2018, 23 pages.

English language abstract for WO 2015/158464 extracted from espacenet.com database on Oct. 21, 2019, 1 page.

English language abstract for WO 2017/103032 extracted from espacenet.com database on Oct. 21, 2019, 2 pages.

English language abstract for WO 2017/103471 extracted from espacenet.com database on Oct. 21, 2019, 1 page.

* cited by examiner

GLASS ARTICLE

FIELD OF THE DISCLOSURE

This disclosure generally relates to a glass article having a first outermost pane and a second outermost pane, wherein a glass transition temperature of the second outermost pane is 1 to 40° C. greater than a first glass transition temperature of the first outermost pane which results in formation of a superior glass article.

BACKGROUND

It is known to make windshields by laminating a first ply of glass, a plastic interlayer, and a second ply of glass. Before 1960, the plies of glass used in this process were ground and polished plate glass, which has excellent freedom from distortion. More recently, it has been customary to use float glass from 1.1 to 4 mm thick for the first and second plies. The float glass is produced by a process such as that described in U.S. Pat. Nos. 3,083,551 and 3,700,542. Although this float glass can be used to make excellent windshields, it can deform in undesirable ways for certain applications when heated.

The glass transition temperature of soda lime glass is from about 530 to 560° C. If the glass is heated above this temperature, the glass can deform and/or shrink, thereby changing dimensions and becoming unusable. This can particularly be the case when a continuous furnace such as a belt furnace is used. This type of furnace can lead to temperature differences between various sides of a single pane of glass or between various panes of glass in the furnace. For example, if two panes of glass are going to be used to create a windshield, when they are placed in the furnace for bending, temperature differences can cause physical asymmetry. This can be especially pronounced in the panes of glass that have different thicknesses or compositions and may lead to areas having optical and physical abnormalities. In some cases, these abnormalities can be severe enough to cause the glass to fail quality control checks. Accordingly, there remains opportunity for improvement.

BRIEF DESCRIPTION OF THE FIGURES

Other advantages of the present disclosure will be readily appreciated, as the same becomes better understood by reference to the following detailed description when considered in connection with the accompanying drawings. The patent or application file contains at least one drawing executed in color. Copies of this patent or patent application publication with color drawing(s) will be provided by the Office upon request and payment of the necessary fee.

FIG. 4b is a gray scale of the table of FIG. 4a.

SUMMARY OF THE DISCLOSURE

This disclosure provides a glass article that includes a first outermost pane, a second outermost pane disposed opposite the first outermost pane, and a transparent interlayer disposed between the first and second outermost panes. The first outermost pane includes soda-lime glass, has a thickness of from 1.1 to 4.0 mm, and has a first glass transition temperature. The second outermost pane includes soda-lime glass and/or aluminosilicate glass, has a thickness of from 0.3 to 1.0 mm, and has a second glass transition temperature. The second glass transition temperature of the second outermost pane is from 1 to 40° C. greater than the first glass transition temperature of the first outermost pane.

DETAILED DESCRIPTION OF THE DISCLOSURE

Figure 2:
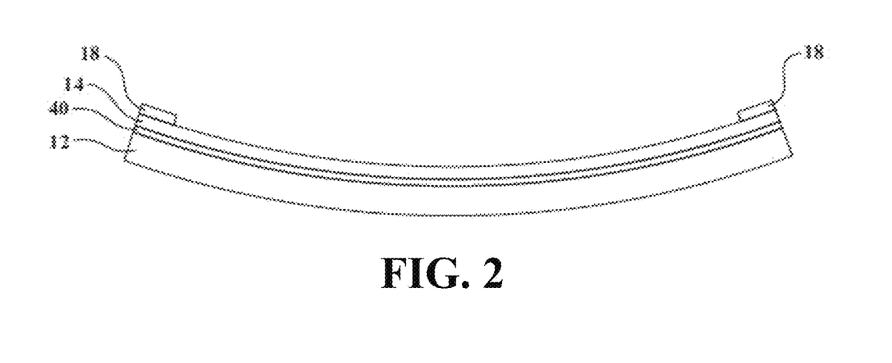
FIG. 2 is a side view of a glass article that includes a first outermost pane, a second outermost pane, and a transparent interlayer that are each curved and complementary in shape to one another.
Figure 3:
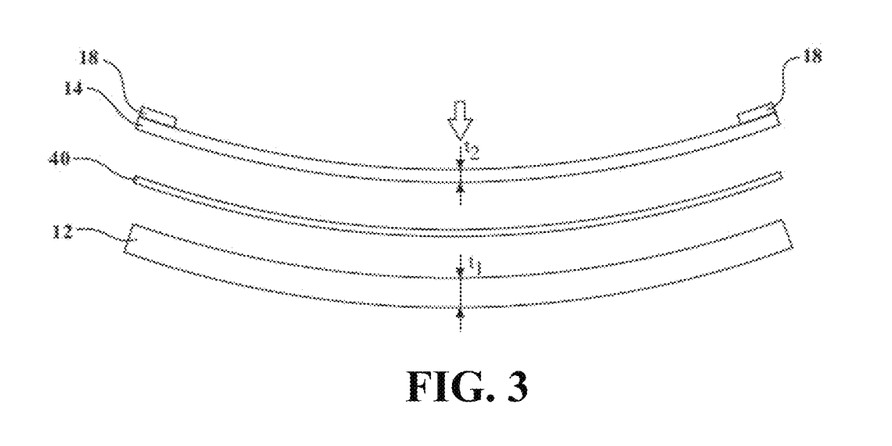
FIG. 3 is an exploded view of the glass article of FIG. 3 that includes thicknesses $t_1$, $t_2$, and $t_3$.

This disclosure provides a glass article 10 having a first outermost pane 12, a second outermost pane 14 and an interlayer 16, e.g. as shown in FIGS. 2 and 3. The glass article 10 is not particularly limited in type, construct, or design except as described herein. For example, the glass article 10 is typically a windshield, e.g. for use in automobiles, trucks, trains, ships, airplanes, etc. Most typically, the glass article 10 is the front windshield of an automobile.

Alternatively, one or both outermost panes 12,14 may be described as a layer or sheet. The terminology "outermost" describes that the first and second outermost panes 12,14 are disposed on the outside of the article 10 and do not have any other layers on top of themselves. In other words, these outermost panes 12,14 face the environment and are the most exterior of the article 10. The first and second outermost panes 12,14 can be alternatively described as top and bottom panes, outside panes, front and back panes, or exterior panes. Typically, the first outermost pane 12 of the article 10, if an automobile windshield, faces the exterior of the automobile while the second outermost pane 14 faces the interior of the automobile. Accordingly, in some embodiments, the first and second outermost panes 12,14 may be alternatively described as outer facing and inner facing panes of an automobile windshield, respectively.

The first and second outermost panes 12, 14 may have any shape and size. Typically, the first and second outermost panes 12, 14 are complementary in shape. In one embodiment, the first and second outermost panes 12, 14 are each curved. The first and second outermost panes 12,14 may each independently have a crossbend at center of 0.1 to 100 mm. Alternatively, the first and second outermost panes 12,14 may each independently have a crossbend at center of 0.1 to 50 mm. The first and second outermost panes 12,14 also may each independently have a radius of curvature of 0 to 100,000 mm. Alternatively, the first and second outermost panes 12,14 also may each independently have a radius of curvature of 0 to 50,000 mm. In other embodiments, all values and ranges of values including and between those described above are expressly contemplated. The crossbend at center and the radius of curvature may be determined with a CMM bench, or any other suitable 3D physical measurement device. For example, the crossbend may be determined using a LP-150F-C Conductive Plastic Linear Sensor manufactured by Green Pot and the radius of curvature may be determined using a 5200 Spring Loaded Probes manufactured by Linear Measurement Instruments (LMI), Corp.

The first outermost pane 12 has a thickness ($t_1$) of from 1.1 to 4.0 mm, e.g. as shown in FIG. 3. In various embodiments, the thickness ($t_1$) is 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, 2.0, 2.05, 2.1, 2.15, 2.2, 2.25, 2.3, 2.35, 2.4, 2.45, 2.5, 2.55, 2.6, 2.65, 2.7, 2.75, 2.8, 2.85, 2.9, 2.95, 3.0, 3.05, 3.1, 3.15, 3.2, 3.25, 3.3, 3.35, 3.4, 3.45, 3.5, 3.55, 3.6, 3.65, 3.7, 3.75, 3.8, 3.85, 3.9, 3.95, 4.0, mm. In other embodiments, all values and ranges of values including and between those described above are expressly contemplated. The length and width of the first outermost pane are not particularly limited and may be chosen by one of skill in the art.

The second outermost pane 14 is disposed opposite the first outermost pane 12, i.e., on an opposite side of the glass article 10. The second outermost pane 14 is typically described as ultrathin glass (UTG) and has a thickness ($t_2$) of from 0.3 to 1.5 mm, e.g. as shown in FIG. 3. In various embodiments, the thickness ($t_2$) is 0.3, 0.35, 0.4, 0.45, 0.5, 0.55, 0.6, 0.65, 0.7, 0.75, 0.8, 0.85, 0.9, 0.95, 1.0, or 1.05, mm. In other embodiments, all values and ranges of values including and between those described above are expressly contemplated. The length and width of the second outermost pane are not particularly limited and may be chosen by one of skill in the art.

The first and second outermost panes 12,14 may have the same or different chemical compositions. For example, the first and second outermost panes 12, 14 may independently be, include, consist essentially of, or consist of, soda-lime glass, as is understood in the art. The terminology "consist essentially of" describes embodiments wherein the soda-lime glass is free from additives, compounds, reactants, or elements of other types of glass, as recognized in the art, such as aluminosilicate glass. In various embodiments the article 10 as a whole and/or the first and second outermost panes 12,14 are free of aluminosilicate glass, ground glass, plate glass, etc.

In various embodiments, the first and/or second outermost panes 12,14 include, are, consist essentially of, or consist of, soda-lime glass having following compositions:

| Compound | Embodiment 1 | Embodiment 2 |
| --- | --- | --- |
| $SiO_2$ | 60 to 80 weight % | 65 to 75 weight % |
| $Al_2O_3$ | 0 to 5 weight % | 0 to 3 weight % |
| CaO | 5 to 20 weight % | 5 to 15 weight % |
| MgO | 0 to 15 weight % | 0 to 10 weight % |
| $Na_2O$ | 5 to 20 weight % | 5 to 15 weight % |
| $K_2O$ | 0 to 8 weight % | 0 to 5 weight % |
| $Na_2O$ and $K_2O$ in total | 10 to 20 weight % | 10 to 15 weight % |

In other embodiments, all values and ranges of values including and between those described above are expressly contemplated. For example, all whole values and fractional values to the tenth position, e.g., 0.1, 1.1, etc. between those described above, are hereby expressly contemplated in various non-limiting embodiments.

In further embodiments, the first and/or second outermost panes 12,14 include, are, consist essentially of, or consist of, soda-lime glass including the following elements:

| Element | Embodiment 3 | Embodiment 4 |
| --- | --- | --- |
| Oxygen | 45 to 55 weight % | 48 to 54 weight % |
| Sodium | 0 to 7 weight % | 0 to 5 weight % |
| Magnesium | 0 to 7 weight % | 0 to 5 weight % |
| Aluminum | 0 to 5 weight % | 0 to 3 weight % |
| Silicon | 20 to 40 weight % | 25 to 35 weight % |
| Potassium | 0 to 15 weight % | 5 to 15 weight % |
| Calcium | 3 to 10 weight % | 3 to 7 weight % |

In other embodiments, all values and ranges of values including and between those described above are expressly contemplated. For example, all whole values and fractional values to the tenth position, e.g., 0.1, 1.1, etc. between those described above, are hereby expressly contemplated in various non-limiting embodiments.

In still other embodiments, the second outermost pane 14 includes, is, consists essentially of, or consists of aluminosilicate glass having the following compositions:

| Compound | Embodiment 5 | Embodiment 6 | Embodiment 7 | Embodiment 8 | Embodiment 9 |
| --- | --- | --- | --- | --- | --- |
| $SiO_2$ | 60 to 80 mol % | 65 to 70 mol % | 62 to 78 mol % | 62 to 65 mol % | 62 to 78 mol % |
| $B_2O_3$ | 0 to 10 mol % | 0 to 5 mol % | 0 to 7 mol % | 0 to 5 mol % | 0 to 3 mol % |
| $Al_2O_3$ | 0 to 15 mol % | 2 to 12 mol % | 0 to 15 mol % | 1 to 4 mol % | 6 to 15 mol % |
| $P_2O5$ | 0 to 10 mol % | 0 to 5 mol % | 0 to 10 mol % | 0 to 5 mol % | 0 to 10 mol % |
| $Li_2O$ | 0 to 10 mol % | 0 to 5 mol % | 0 to 10 mol % | 0 to 5 mol % | 0 to 10 mol % |
| $Na_2O$ | 10 to 20 mol % | 12 to 18 mol % | 12 to 20 mol % | 15 to 18 mol % | 10 to 20 mol % |
| $K_2O$ | 0 to 5 mol % | 0 to 3 mol % | 0 to 5 mol % | 0 to 2 mol % | 2 to 10 mol % |
| MgO | 5 to 20 mol % | 5 to 15 mol % | 10 to 20 mol % | 12 to 18 mol % | 5 to 20 mol % |
| CaO | 0 to 10 mol % | 5 to 10 mol % | 1 to 5 mol % | 1 to 3 mol % | 0 to 5 mol % |
| SrO | 0 to 3 mol % | 0 to 1 mol % | 0 to 3 mol % | 0 to 1 mol % | 0 to 3 mol % |
| BaO | 0 to 3 mol % | 0 to 1 mol % | 0 to 3 mol % | 0 to 1 mol % | 0 to 3 mol % |
| ZnO | 0 to 3 mol % | 0 to 1 mol % | 0 to 3 mol % | 0 to 1 mol % | 0 to 3 mol % |
| $ZrO_2$ | 0 to 3 mol % | 0 to 1 mol % | 0 to 3 mol % | 0 to 1 mol % | 0 to 3 mol % |
| $TiO_2$ | 0 to 3 mol % | 0 to 1 mol % | 0 to 3 mol % | 0 to 1 mol % | 0 to 3 mol % |
| $SnO_2$ | 0 to 3 mol % | 0 to 1 mol % | 0 to 3 mol % | 0 to 1 mol % | 0 to 3 mol % |
| Cl | 0 to 3 mol % | 0 to 1 mol % | 0 to 3 mol % | 0 to 1 mol % | 0 to 3 mol % |

In further embodiments, the second outermost pane 14 includes, is, consists essentially of, or consists of aluminosilicate glass having the following compositions:

| Compound | Embodiment 10 | Embodiment 11 | Embodiment 12 | Embodiment 13 | Embodiment 14 |
| --- | --- | --- | --- | --- | --- |
| $SiO_2$ | 62 to 70 mol % | 65 to 75 mol % | 66 to 74 mol % | 60 to 72 mol % | 62 to 66 mol % |
| $B_2O_3$ | 0 to 1 mol % | 0 to 10 mol % | 0 to 3 mol % | 0 to 5 mol % | 0 to 3 mol % |
| $Al_2O_3$ | 6 to 10 mol % | 5 to 20 mol % | 8 to 14 mol % | 5 to 10 mol % | 6 to 15 mol % |
| $P_2O5$ | 0 to 3 mol % | 0 to 5 mol % | 0 to 2 mol % | 0 to 10 mol % | 0 to 5 mol % |
| $Li_2O$ | 0 to 3 mol % | 0 to 5 mol % | 0 to 2 mol % | 0 to 10 mol % | 0 to 5 mol % |
| $Na_2O$ | 10 to 15 mol % | 10 to 20 mol % | 10 to 15 mol % | 10 to 20 mol % | 12 to 18 mol % |
| $K_2O$ | 2 to 6 mol % | 0 to 5 mol % | 0 to 2 mol % | 0 to 5 mol % | 0 to 2 mol % |
| MgO | 10 to 15 mol % | 5 to 20 mol % | 5 to 12 mol % | 5 to 20 mol % | 5 to 12 mol % |
| CaO | 0 to 1 mol % | 0 to 3 mol % | 0 to 1 mol % | 0 to 3 mol % | 0 to 1 mol % |
| SrO | 0 to 1 mol % | 0 to 3 mol % | 0 to 1 mol % | 0 to 3 mol % | 0 to 1 mol % |
| BaO | 0 to 1 mol % | 0 to 3 mol % | 0 to 1 mol % | 0 to 3 mol % | 0 to 1 mol % |
| ZnO | 0 to 1 mol % | 0 to 3 mol % | 0 to 1 mol % | 0 to 3 mol % | 0 to 1 mol % |
| $ZrO_2$ | 0 to 1 mol % | 0 to 3 mol % | 0 to 1 mol % | 0 to 3 mol % | 0 to 1 mol % |

-continued

| Compound | Embodiment 10 | Embodiment 11 | Embodiment 12 | Embodiment 13 | Embodiment 14 |
|---|---|---|---|---|---|
| $TiO_2$ | 0 to 1 mol % | 0 to 3 mol % | 0 to 1 mol % | 0 to 3 mol % | 0 to 1 mol % |
| $SnO_2$ | 0 to 1 mol % | 0 to 3 mol % | 0 to 1 mol % | 0 to 3 mol % | 0 to 1 mol % |
| Cl | 0 to 1 mol % | 0 to 3 mol % | 0 to 1 mol % | 0 to 3 mol % | 0 to 1 mol % |

In other embodiments, all values and ranges of values including and between those described above are expressly contemplated. For example, all whole values and fractional values to the tenth position, e.g., 0.1, 1.1, etc. between those described above, are hereby expressly contemplated in various non-limiting embodiments.

In even further embodiments, the second outermost pane 14 includes, is, consists essentially of, or consists of aluminosilicate glass having the following compositions:

| Element | Embodiment 15 | Embodiment 16 |
|---|---|---|
| Oxygen | 45 to 55 weight % | 48 to 54 weight % |
| Sodium | 0 to 7 weight % | 0 to 5 weight % |
| Magnesium | 0 to 7 weight % | 0 to 5 weight % |
| Aluminum | 1 to 5 weight % | 1 to 3 weight % |
| Silicon | 20 to 40 weight % | 25 to 35 weight % |
| Potassium | 0 to 15 weight % | 5 to 15 weight % |
| Calcium | 0 to 5 weight % | 0 to 3 weight % |

In other embodiments, all values and ranges of values including and between those described above are expressly contemplated. For example, all whole values and fractional values to the tenth position, e.g., 0.1, 1.1, etc. between those described above, are hereby expressly contemplated in various non-limiting embodiments.

In even further embodiments, the first outermost pane 12 is soda-lime glass including: $Al_2O_3$: 0 to 2.0 weight %, and $Na_2O$ and $K_2O$ in total: 13.0 to 15.5 weight % while the second outermost pane is soda-lime glass including: $Al_2O_3$: 0 to 3.5 weight %, and $Na_2O$ and $K_2O$ in total: 12.0 to 14.5 weight %. In another embodiment, the first outermost pane is soda-lime glass including $SiO_2$: 68.0 to 75.0 weight %, $Al_2O_3$: 0 to 2.0 weight %, CaO: 7.0 to 13.0 weight %, MgO: 0 to 7.0 weight %, $Na_2O$: 12.0 to 15.0 weight %, $K_2O$: 0 to 3.0 weight %, and $Na_2O$ and $K_2O$ in total: 13.0 to 15.5 weight % while the second outermost pane 14 is soda-lime glass including: $SiO_2$: 68.0 to 75.0 weight %, $Al_2O_3$: 0 to 3.5 weight %, CaO: 7.0 to 13.0 weight %, MgO: 0 to 7.0 weight, $Na_2O$: 12.0 to 15.0 weight %, $K_2O$: 0 to 3.0 weight %, $Na_2O$ and $K_2O$ in total: 12.0 to 14.5 weight %, and $Na_2O$ and $K_2O$ in total: 13.0 to 15.5 weight %. In other embodiments, all values and ranges of values including and between those described above are expressly contemplated. For example, all whole values and fractional values to the tenth position, e.g., 0.1, 1.1, etc. between those described above, are hereby expressly contemplated in various non-limiting embodiments.

In still other embodiments, the soda-lime glass of the first outermost pane and/or the second outermost pane 12,14 each independently includes: $SiO_2$ in an amount of from 65 to 75 weight %, $Al_2O_3$ in an amount of from 0 to 3 weight %, CaO in an amount of from 5 to 15 weight %, MgO in an amount of from 0 to 10 weight %, $Na_2O$ in an amount of from 5 to 15 weight %, and $K_2O$ in an amount of from 0 to 5 weight %, wherein a sum of the amounts of $Na_2O$ and $K_2O$ is from 10 to 15 weight %, each based on a total weight of said soda-lime glass.

If the second outermost pane 14 includes aluminosilicate glass, and also in independent embodiments, the aluminosilicate glass may comprise $SiO_2$ in an amount of from 60 to 70 weight %, $B_2O_3$ in an amount of from 0 to 5 weight %, $Al_2O_3$ in an amount of from 1 to 15 weight %, $P_2O_5$ present in an amount of from 0 to 5 weight %, $Li_2O$ present in an amount of from 0 to 5 weight %, $Na_2O$ present in an amount of from 12 to 18 weight %, $K_2O$ present in an amount of from 0 to 5 weight %, MgO present in an amount of from 5 to 12 weight %, CaO present in an amount of from 0 to 10 weight %, SrO present in an amount of from 0 to 5 weight %, BaO present in an amount of from 0 to 5 weight %, ZnO present in an amount of from 0 to 5 weight %, $ZrO_2$ present in an amount of from 0 to 5 weight %, $TiO_2$ present in an amount of from 0 to 5 weight %, $SnO_2$ present in an amount of from 0 to 5 weight %, and Cl present in an amount of from 0 to 5 weight %. For example, all whole values and fractional values to the tenth position, e.g., 0.1, 1.1, etc. between those described above, are hereby expressly contemplated in various non-limiting embodiments. It is contemplated that the second outermost pane 14 may be a combination, mixture, or hybrid, of soda-lime glass and aluminosilicate glass.

The glass article 10 further includes a transparent interlayer 16 that is disposed between and the first and second outermost panes 12,14. In other words, the transparent interlayer 16 is sandwiched between the first and second outermost panes 12,14. In certain embodiments, the transparent interlayer 16 is in direct contact with the first and second outermost panes 12,14 without any intervening layers, such as tie layers, e.g. as shown in FIG. 3. In other embodiments, a portion of the transparent layer 16 is in direct contact with both the first and second outermost panes 12,14. For example, a portion of the transparent layer 16 may be in direct contact with both the first and second outermost panes 12,14 when the glass article 10 includes black ceramic edging, heated grid lines, etc. In still further embodiments, the transparent interlayer 16 may be disposed between the first and second outermost panes 12,14 with the transparent interlayer 16 physically separated from one or both of the first or second outermost panes 12,14, such as, for example, when the glass article 10 includes a layer of silver or other coating layer. The terminology "transparent" is as understood in the float glass and windshield arts and typically describes that light passes through the interlayer 16. The transparent interlayer 16 is not opaque.

The transparent interlayer 16 also is not particularly limited in size and shape and is shaped most often in a shape complementary to the shape of the first and second outermost panes 12,14, e.g. as shown in FIGS. 2 and 3. The transparent interlayer 16 typically has a thickness ($t_3$) of from 0.3 to 2.28 mm, e.g. as shown in FIG. 3. In various embodiments, the thickness ($t_3$) is 0.3, 0.35, 0.4, 0.45, 0.5, 0.55, 0.6, 0.65, 0.7, 0.75, 0.76, 0.8, 0.85, 0.9, 0.95, 1.0, 1.05, 1.1, 1.15, 1.2, 1.25, 1.3, 1.35, 1.4, 1.45, 1.5, 1.52, 1.55, 1.6, 1.65, 1.7, 1.75, 1.8, 1.85, 1.9, 1.95, 2.0, 2.05, 2.1, 2.15, 2.2, 2.25, or 2.28, mm. All ranges and values including and between those described above are also hereby expressly contemplated for use herein in various non-limiting embodiments.

The transparent interlayer 16 is not particularly limited in composition and typically is or includes polyvinyl butyral or ethylene-vinyl acetate. The transparent interlayer 16 may be utilized as a sheet, as a polymer, or as individual reactive components that then react to form the transparent interlayer 16. The transparent interlayer 16 may be provided in a cured, partially cured, or uncured state. Other non-limiting examples of suitable polymers to use for the transparent interlayer 16 include plasticized polyvinyl butyral, polyurethanes, etc. The transparent interlayer 16 may be provided as a non-transparent polymer or compound which then becomes transparent upon heating and/or processing.

In one embodiment, the first outermost pane 12 has a thickness ($t_1$) of 2.1 mm±0.05 mm. In another embodiment, the second outermost pane 14 has a thickness ($t_2$) of 0.7 mm±0.05 mm. In still another embodiment, the transparent interlayer 16 has a thickness ($t_3$) of 0.76 mm±0.25 mm. All ranges and values including and between those described above are also hereby expressly contemplated for use herein in various non-limiting embodiments.

The first and second outermost panes 12,14 each have a glass transition temperature, $T_{g1}$ and $T_{g2}$, respectively. More specifically, the first outermost pane 12 has a first glass transition temperature $T_{g1}$ and the second outermost pane 14 has a second glass transition temperature $T_{g2}$. $T_{g1}$ is typically from 535 to 554° C. Alternatively, $T_{g1}$ is from 535 to 550, 535 to 545, 540 to 554, 545 to 554, or 540 to 550, ° C. $T_{g2}$ is typically from 550 to 590° C. Alternatively, $T_{g2}$ is from 560 to 590, 570 to 590, 550 to 580, 550 to 570, or 560 to 580, ° C.

The second glass transition temperature $T_{g2}$ of the second outermost pane 14 is from 1 to 40° C. greater than the first glass transition temperature $T_{g1}$ of the first outermost pane 12. In various embodiments, the second glass transition temperature $T_{g2}$ is from 1 to 5, 1 to 10, 1 to 15, 1 to 20, 1 to 25, 1 to 30, 1 to 35, 5 to 10, 5 to 15, 10 to 15, etc., ° C. greater than the first glass transition temperature $T_{g1}$ of the first outermost pane 12. In various embodiments, the second glass transition temperature $T_{g2}$ may be any value or range of values including and between the aforementioned values greater than the first glass transition temperature of the first outermost pane.

The differences in the glass transition temperatures $T_{g1}$ and $T_{g2}$ can typically be customized based on composition of the first and second outermost panes 12,14, respectively. In various embodiments, the second glass transition temperature $T_{g2}$ of the second outermost pane 14 is customized such that the second outermost pane 14 can bend in the same way as, or consistently with, the first outermost pane 12 in a furnace notwithstanding the difference in thickness, and thus, thermal mass. Since the second outermost pane 14 is thinner than the first outermost pane 12, the difference in glass transition temperatures $T_{g1}$ and $T_{g2}$ promotes more predictable and consistent bending between the first and second outermost panes 12,14. This allows for production of a glass article 10 with more uniform optical and physical properties.

The glass article 10 typically has excellent optical and strength properties. In various embodiments, the glass article 10 has one or more of the following ISRA values: a central zone of less than 160 milidiopters, a top zone of less than 180 milidiopters, and a side pillar of less than 120 milidiopters. In one embodiment, the glass article 10 has all of the following ISRA values: a central zone of less than 160 milidiopters, a top zone of less than 180 milidiopters, and a side pillar of less than 120 milidiopters. Without being bound to any particular theory, it is believed that the combination of the particular pane thicknesses (i.e., the thickness of the first and second outermost panes 12,14) and the Tg differential between the first and second outermost panes 12,14 cooperate to establish the excellent optical properties of the glass article 10 as demonstrated by the ISRA values.

Method of Forming a Glass Article:

The disclosure also provides a method of forming the glass article 10. The method includes the step of forming a first pane of soda-lime glass via a float process wherein the first pane has a thickness of from 1.1 to 4.0 mm. The first pane may be any as described above. The method also includes the step of forming a second pane of soda-lime glass and/or aluminosilicate glass via a float process wherein the second pane has a thickness of from 0.3 to 1.05 mm. The second may also be any as described above. The float process is known in the art and the instant disclosure may utilize any one or more steps of the float process herein. The blanks may have the same thickness as described above.

The method also includes the step of cutting a first blank from the first pane and a second blank from the second pane. The first and second blanks are not limited in size and shape and may be chosen by one of skill in the art.

Typically, there are two different ways of cutting blanks from the glass produced by glass float production line. The glass float production line produces a continuous "ribbon" of glass, which is then cut into blanks using any technique known it the art. Blanks used for automotive windshields, for example, are often rectangular. The rectangular blanks may be oriented either so the long axis is parallel to the axis of the ribbon of glass from the float, or so the long axis is perpendicular to the axis of the ribbon. After the blanks are cut, it is customary to cut from the blanks pieces of a suitable outline shape to produce glass for a specific window for a specific vehicle, using a pattern cutter. Subsequently, edging, beveling, or inspecting may be completed.

Figure 1:
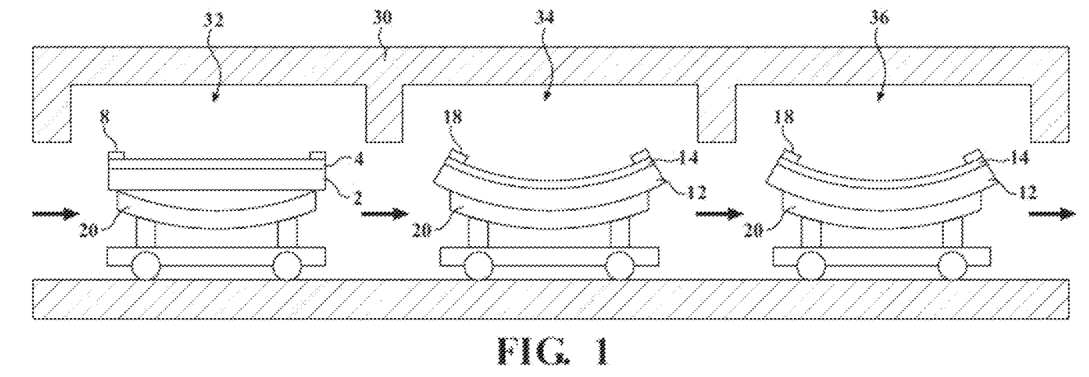
FIG. 1 is a process diagram illustrating movement of panes of glass moving through a series of furnaces.

The method further includes the step of forming the first and second blanks into a desired shape. Again, the desired shape may be any chosen by one of skill in the art and may be curved, e.g. for a windshield. Moreover, the step of forming may be completed by any step known in the art. For example, the step of forming may be further defined as bending or curving the first and second blanks. To produce bent blanks, the first and second blanks may be of slightly different outline. The first and second blanks may be mounted on a series of bending molds 20 of concave elevation with a suitable parting material between the blanks, such as diatomaceous earth or calcium carbonate, e.g. as shown in FIG. 1. The glass-laden molds 20 can then be conveyed through an elongated tunnel where the blanks are heated to bending temperature to sag the blanks to the concave elevational shape of the mold 20. The bent blanks may then be cooled at a controlled rate until they are cool enough for handling. An alternative technique involving press bending individual blanks to their desired shape.

The method also includes the step of providing an interlayer. The interlayer may be provided as a sheet, as a polymer, or as reactive components that then react to form the transparent interlayer. The interlayer may be provided in a cured, partially cured, or uncured state. For example, the interlayer may be opaque or otherwise non transparent when provided and then may become transparent upon processing or heating.

The method further includes the step of aligning the first shaped blank, the interlayer, and the second shaped blank. The step of aligning may be any known in the art. The first shaped blank, the interlayer, and the second shaped blank can be rotated into a desired position.

The method also includes the step of combining the first shaped blank, the interlayer, and the second shaped blank thereby forming the glass article. The step of combining may include, or may be further defined as, laminating the first shaped blank, the interlayer, and the second shaped blank such that the interlayer changes from opaque or non-transparent to transparent. After lamination, the first shaped blank may be described as the first outermost pane 12. Similarly, after lamination, the second shaped blank may be described as the second outermost pane 14 and the interlayer may be described as the transparent interlayer 16.

In various embodiments, when the first and second shaped blanks are laminated to the interlayer, a sandwich is assembled to form a concave outer surface of the sandwich to face the interior of a vehicle and the other bent blank of the pair forming a convex outer surface of the sandwich to face the exterior of the vehicle.

In other embodiments, the step of laminating is conducted in two stages. The first stage, e.g. pre-pressing, can be performed using rubber tubing edge channels (i.e., vacuum ring). The matching pairs of bent first and second blanks can be assembled with the interlayer disposed therebetween to form sandwich structures. The tubing can then fitted around an edge periphery of each sandwich and connected to a vacuum source. The pre-pressing can be performed at a set point temperature of approximately 120-150° C. and a target glass temperature of approximately 95° C. for 10-30 minutes under vacuum. Those of ordinary skill in the art will appreciate that alternative methods may also be used for pre-pressing, such as, vacuum bag or nip roller methods. After pre-pressing, the sandwich can then be autoclaved and allowed to cool to room temperature.

EXAMPLES

Four glass articles are formed as automobile windshields. Three of the glass articles (Articles 1-3) are representative of embodiments of this disclosure. One of the glass articles (Comparative Article 1) does not represent an embodiment of this disclosure, does not include a difference in glass transition temperatures between first and second outermost panes, and is evaluated as a comparative example.

Articles 1-3 and Comparative Article 1 are formed and each includes a first outermost pane 12, a transparent interlayer 16, and a second outermost pane 14. Each of the first outermost panes 12 is formed using a first soda-lime glass composition so as to maintain the same first glass transition temperature (e.g. $T_{g1}$). Each of the second outermost panes 12 is formed using differing soda-lime glass compositions to customize different glass transition temperatures (e.g. $T_{g2}$). Each transparent interlayer 16 is formed using the same polyvinyl butyral. The length and width of the Articles 1 and 2 and Comparative Articles 1-3 are also the same. The difference between these Articles is the second glass transition temperature (e.g. $T_{g2}$) of the second outermost pane 14, as set forth below. After formation, each of the Articles 1-3 and Comparative Article 1 are evaluated to determine shape difference between the first and second outermost panes 12,14. The results are set forth in the table of FIG. 4a.

Figure 4A:
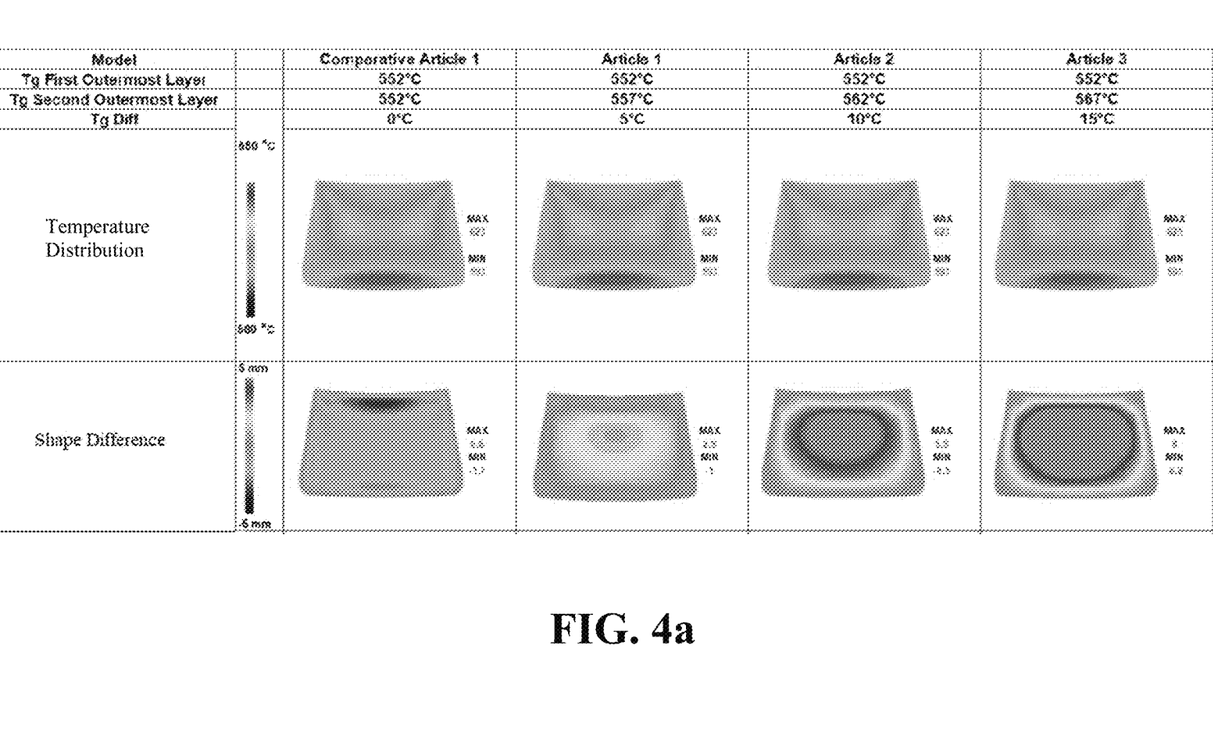
FIG. 4a is a colored table that sets forth the results described in the Examples.
Figure 4B:
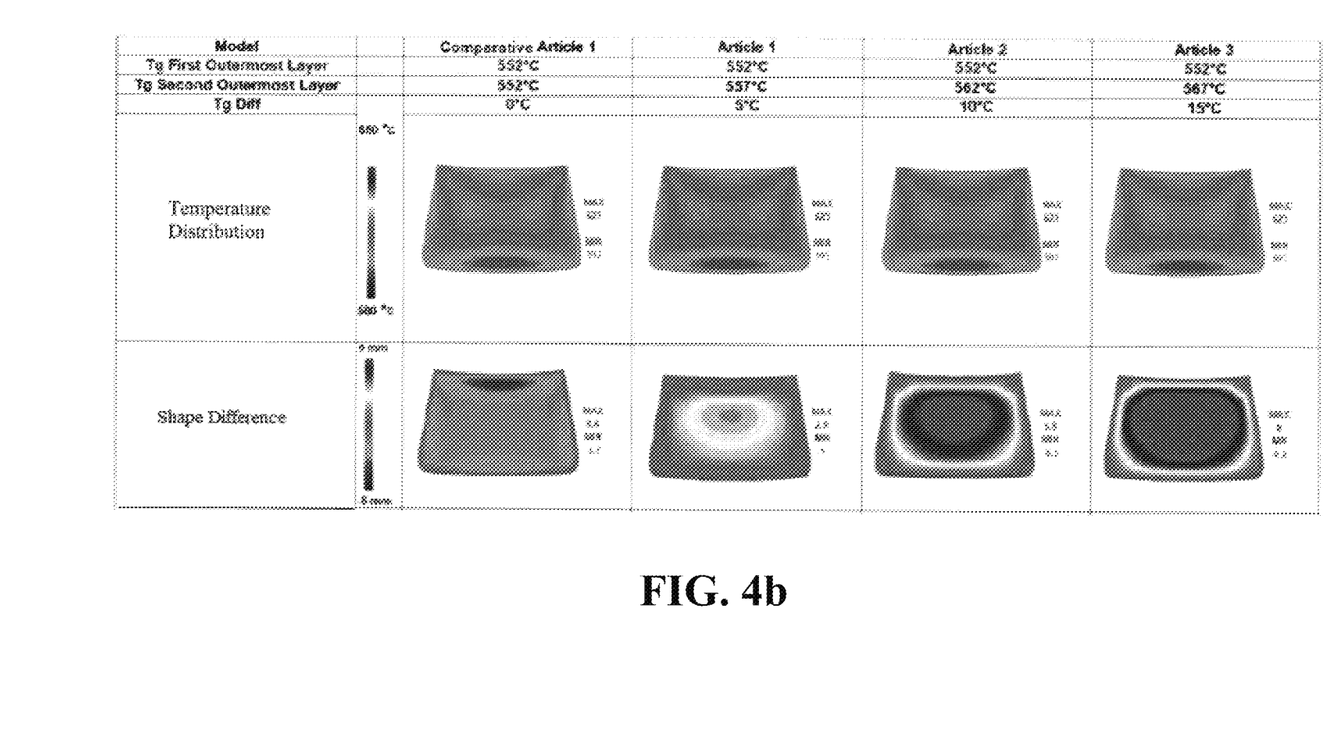

FIG. 4a is a table that includes the thickness ($t_1$) of the first outermost pane of 2.1 mm and the thickness ($t_2$) of the second outermost pane of 0.55 mm. Moreover, the difference in glass transition temperatures is also set forth. The first row of FIG. 4a is labeled "temperature distribution" and is the same for all Articles. FIG. 4a also includes a maximum and minimum temperature value in degrees Celsius. FIG. 4a shows the temperature distribution is held as a constant across the articles when in the furnace.

FIG. 4a also includes a row of shape difference having a scale of from −5 mm to +5 mm. Negative values represent the second outermost pane 14 of 0.55 mm being over bent and positive values represent the second outermost pane 14 being under bent. A value of zero mm represents no bend difference and represents a theoretically perfect fit, relative to bend, between the first and second outermost panes 12,14.

This data surprisingly demonstrates that when panes of significantly different thickness are used to create a glass article 10, the chemical composition of the second outermost pane 14 should be varied to raise its $T_g$ relative to the $T_g$ of the first outermost pane 12 to ensure consistent bending performance between the two panes. For example, in comparing Article 1 to Comparative Article 1, raising the $T_g$ of the outermost pane 14 by 5° C. resulted in significantly better bending performance and thus an improved windshield shape.

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements described above selected and combined from any portion of the disclosure.

One or more of the values described above may vary by ±5%, ±10%, ±15%, ±20%, ±25%, etc. so long as the variance remains within the scope of the disclosure. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on.

What is claimed is:

1. A glass article comprising:
   A. a first outermost pane comprising soda-lime glass having a thickness of from 1.1 to 4.0 mm and a first glass transition temperature;
   B. a second outermost pane comprising chemically untreated soda-lime float glass and/or chemically untreated aluminosilicate float glass disposed opposite said rust outermost pane having a thickness of from 0.3 to 1.05 mm and a second glass transition temperature; and
   C. a transparent interlayer disposed between said first and second outermost panes;
   wherein said second glass transition temperature of said second outermost pane is from 5 to 15° C. greater than said first glass transition temperature of said first outermost pane, and
   wherein said soda-lime glass of said first outermost pane comprises: $SiO_2$ in an amount of from 65 to 75 weight %, Al$_2$O$_3$ in an amount of from 0 to 3 weight %, CaO in an amount of from 5 to 15 weight %, MgO in an amount of from 0 to 10 weight %, Na$_2$O in an amount of from 5 to 15 weight %, and K$_2$O in an amount of from 0 to 5 weight %, wherein a sum of the amounts of Na$_2$O and K$_2$O is from 10 to 15 weight %, each based on a total weight of said soda-lime glass.

2. The glass article of claim 1 wherein said second glass transition temperature of said second outermost pane is from 5 to 10° C. greater than said first glass transition temperature of said first outermost pane.

3. The glass article of claim 1 wherein said first glass transition temperature is from 535 to 554° C. and said second glass transition temperature is from 550 to 590° C.

4. The glass article of claim 1 wherein said second outermost pane comprises said soda-lime float glass comprising SiO$_2$ in an amount of from 65 to 75 weight %, Al$_2$O$_3$ in an amount of from 0 to 3 weight %, CaO in an amount of from 5 to 15 weight %, MgO in an amount of from 0 to 10 weight %, Na$_2$O in an amount of from 5 to 15 weight %, and K$_2$O in an amount of from 0 to 5 weight %, wherein a sum of the amounts of Na$_2$O and K$_2$O is from 10 to 15 weight %, each based on a total weight of said soda-lime glass.

5. The glass article of claim 1 wherein said second outermost pane comprises said aluminosilicate float glass comprising SiO$_2$ in an amount of from 60 to 70 weight %, B$_2$O$_3$ in an amount of from 0 to 5 weight %, Al$_2$O$_3$ in an amount of from 1 to 15 weight %, P$_2$O$_5$ present in an amount of from 0 to 5 weight %, Li$_2$O present in an amount of from 0 to 5 weight %, Na$_2$O present in an amount of from 12 to 18 weight %, K$_2$O present in an amount of from 0 to 5 weight %, MgO present in an amount of from 5 to 12 weight %, CaO present in an amount of from 0 to 10 weight %, SrO present in an amount of from 0 to 5 weight %, BaO present in an amount of from 0 to 5 weight %, ZnO present in an amount of from 0 to 5 weight %, ZrO$_2$ present in an amount of from 0 to 5 weight %, TiO$_2$ present in an amount of from 0 to 5 weight %, SnO$_2$ present in an amount of from 0 to 5 weight %, and Cl present in an amount of from 0 to 5 weight %, each based on a total weight of said aluminosilicate glass.

6. The glass article of claim 1 having a crossbend dimension of from 0.1 to 50 mm and a radius of curvature of from greater than 0 to 50,000 mm, as determined by a LP-150F-C Conductive Plastic Linear Sensor and a 5200 Spring Loaded Probes, respectively.

7. The glass article of claim 1 wherein said first outermost pane is soda-lime glass.

8. The glass article of claim 1 wherein said first outermost pane has a thickness of 1.6 to 2.4 mm and wherein said second outermost pane has a thickness of 0.5 to 0.75 mm.

9. The glass article of claim 1 wherein said second outermost pane is soda-lime float glass.

10. The glass article of claim 1 wherein said second outermost pane is aluminosilicate float glass.

11. The glass article of claim 1 wherein said second outermost pane is a hybrid of soda-lime and aluminosilicate float glass.

12. The glass article of claim 1 that is further defined as a windshield.

13. The glass article of claim 1 wherein each of said first and second outermost panes is curved.

14. The glass article of claim 1 wherein said transparent interlayer is in direct contact with said first and second outermost panes.

15. A glass article comprising:
A. a first outermost pane comprising soda-lime glass having a thickness of from 1.1 to 4.0 mm and a first glass transition temperature;
B. a second outermost pane comprising aluminosilicate float glass disposed opposite said first outermost pane having a thickness of from 0.3 to 1.05 mm and a second glass transition temperature; and
C. a transparent interlayer disposed between said first and second outermost panes;
wherein said second glass transition temperature of said second outermost pane is from 5 to 15° C. greater than said first glass transition temperature of said first outermost pane, and
wherein said soda-lime glass of said first outermost pane comprises: SiO$_2$ in an amount of from 65 to 75 weight %, Al$_2$O$_3$ in an amount of from 0 to 3 weight %, CaO in an amount of from 5 to 15 weight %, MgO in an amount of from 0 to 10 weight %, Na$_2$O in an amount of from 5 to 15 weight %, and K$_2$O in an amount of from 0 to 5 weight %, wherein a sum of the amounts of Na$_2$O and K$_2$O is from 10 to 15 weight %, each based on a total weight of said soda-lime glass,
wherein said aluminosilicate glass of said second outermost pane comprises SiO$_2$ in an amount of from 62 to 65 mol %, B$_2$O$_3$ in an amount of from 0 to 5 mol %, Al$_2$O$_3$ in an amount of from 1 to 4 mol %, P$_2$O$_5$ present in an amount of from 0 to 5 mol %, Li$_2$O present in an amount of from 0 to 5 mol %, Na$_2$O present in an amount of from 15 to 18 mol %, K$_2$O present in an amount of from 0 to 2 mol %, MgO present in an amount of from 12 to 18 mol %, CaO present in an amount of from 1 to 3 mol %, SrO present in an amount of from 0 to 1 mol %, BaO present in an amount of from 0 to 1 mol %, ZnO present in an amount of from 0 to 1 mol %, ZrO$_2$ present in an amount of from 0 to 1 mol %, TiO$_2$ present in an amount of from 0 to 1 mol %, SnO$_2$ present in an amount of from 0 to 1 mol %, and Cl present in an amount of from 0 to 1 mol %, each based on a total mol % of said aluminosilicate wherein CaO is present in said aluminosilicate glass of said second outermost pane in an amount from greater than 1 to 10 weight %.

16. A method of forming a glass article, said method comprising the steps of:
A. forming a first pane of soda-lime glass via a float process wherein the first pane has a thickness of from 1.1 to 4.0 mm and a first glass transition temperature,
B. forming a second pane of chemically untreated soda-lime glass and/or chemically untreated aluminosilicate glass via a float process wherein the second pane has a thickness of from 0.3 to 1.05 mm and a second glass transition temperature,
C. cutting a first blank from the first pane and a second blank from the second pane wherein each blank has a length and first and second glass transition temperatures, respectively;
D. forming the first and second blanks into a desired shape;
E. providing an interlayer;
F. combining the first shaped blank, the interlayer, and the second shaped blank to form the glass article comprising a first outermost pane having a thickness of from 1.1 to 4.0 mm and the first glass transition temperature, a second outermost pane disposed opposite the first outermost pane having a thickness of from 0.3 to 1.05 mm and the second glass transition temperature, and the interlayer disposed between the first and second outermost panes, wherein the second glass transition temperature of the second outermost pane is 5 to 15° C. greater than the first glass transition temperature of the first outermost pane;

wherein said soda-lime glass of said first outermost pane comprises: $SiO_2$ in an amount of from 65 to 75 weight %, $Al_2O_3$ in an amount of from 0 to 3 weight %, CaO in an amount of from 5 to 15 weight %, MgO in an amount of from 0 to 10 weight %, $Na_2O$ in an amount of from 5 to 15 weight %, and $K_2O$ in an amount of from 0 to 5 weight %, wherein a sum of the amounts of $Na_2O$ and $K_2O$ is from 10 to 15 weight %, each based on a total weight of said soda-lime glass.

17. The method of claim 16 wherein the second glass transition temperature of the second outermost pane is from 5 to 10° C. greater than the first glass transition temperature of the first outermost pane.

18. The method of claim 16 further comprising the step of heating each of the first shaped blank and the second shaped blank to a preselected temperature simultaneously.

19. The method of claim 16 wherein the step of combining is further defined as laminating such that the interlayer is further defined as a transparent interlayer.

20. The method of claim 16 wherein the first outermost pane is soda-lime glass.

21. The method of claim 16 wherein the first outermost pane has a thickness of 1.6 to 2.4 mm and wherein the second outermost pane has a thickness of 0.5 to 0.75 mm.

22. The method of claim 16 wherein the second outermost pane is soda-lime glass, aluminosilicate glass, or a hybrid of soda-lime glass and aluminosilicate glass.

23. The method of claim 16 wherein the interlayer is in direct contact with the first and second outermost panes.

* * * * *

UNITED STATES PATENT AND TRADEMARK OFFICE
CERTIFICATE OF CORRECTION

PATENT NO. : 10,981,357 B2
APPLICATION NO. : 15/994991
DATED : April 20, 2021
INVENTOR(S) : Timothy D. Peck et al.

Page 1 of 1

It is certified that error appears in the above-identified patent and that said Letters Patent is hereby corrected as shown below:

In the Claims

Claim 1, Column 10, Line 57, please delete "said rust outermost pane" and replace with -- said first outermost pane --

Claim 15, Column 12, Line 40, please delete "said aluminosilicate wherein" and replace with -- said aluminosilicate glass, wherein --

Signed and Sealed this
Twenty-fifth Day of May, 2021

Drew Hirshfeld
*Performing the Functions and Duties of the
Under Secretary of Commerce for Intellectual Property and
Director of the United States Patent and Trademark Office*